United States Patent [19]
Brodersen

[11] Patent Number: 5,954,400
[45] Date of Patent: Sep. 21, 1999

[54] CABLE DRIVE MECHANICAL SEAT SUSPENSION

[75] Inventor: Cole T. Brodersen, Davenport, Iowa

[73] Assignee: Sears Manufacturing Company, Davenport, Iowa

[21] Appl. No.: 08/958,769

[22] Filed: Oct. 26, 1997

Related U.S. Application Data

[63] Continuation-in-part of application No. 08/758,288, Dec. 3, 1996, abandoned, which is a continuation of application No. 08/502,150, Jun. 7, 1995, Pat. No. 5,580,027.

[51] Int. Cl.⁶ .................................................. F16M 13/00
[52] U.S. Cl. ........................... 297/339; 248/564; 248/584; 248/280.11
[58] Field of Search ................................... 248/564, 584, 248/162.1, 421, 280.11, 292.11

[56] References Cited

U.S. PATENT DOCUMENTS

| | | | |
|---|---|---|---|
| 4,072,287 | 2/1978 | Swenson et al. | 248/399 |
| 4,448,386 | 5/1984 | Moorhouse et al. | 248/564 |
| 4,659,052 | 4/1987 | Nagata | 248/575 |
| 4,856,763 | 8/1989 | Brodersen et al. | 248/588 X |
| 4,943,037 | 7/1990 | Brodersen et al. | 267/131 |
| 5,580,027 | 12/1996 | Brodersen | 248/564 |

*Primary Examiner*—Jose V. Chen
*Assistant Examiner*—Stephen Vu
*Attorney, Agent, or Firm*—Niro, Scavone, Haller & Niro

[57] ABSTRACT

A vehicle seat suspension system is provided which includes, in a seat support comprising an upper housing and a lower housing and a scissors linkage support apparatus, a spring fixed to the upper housing and a cable attached to the spring and wrapping around a pulley attached to the upper housing and downwardly to an arcuate or eccentric pulley attached at the scissors linkage axis pivot and an actuator knob which allows a seat occupant to tighten or loosen the cable and raise or lower the seat to provide a vehicle seat suspension system. The present invention provides a suspension system which can be discreetly and infinitely adjustable and which allows a user to adjust the suspension curve characteristics of the seat by utilizing a non-circular drive pulley which is movably adjustable.

5 Claims, 3 Drawing Sheets

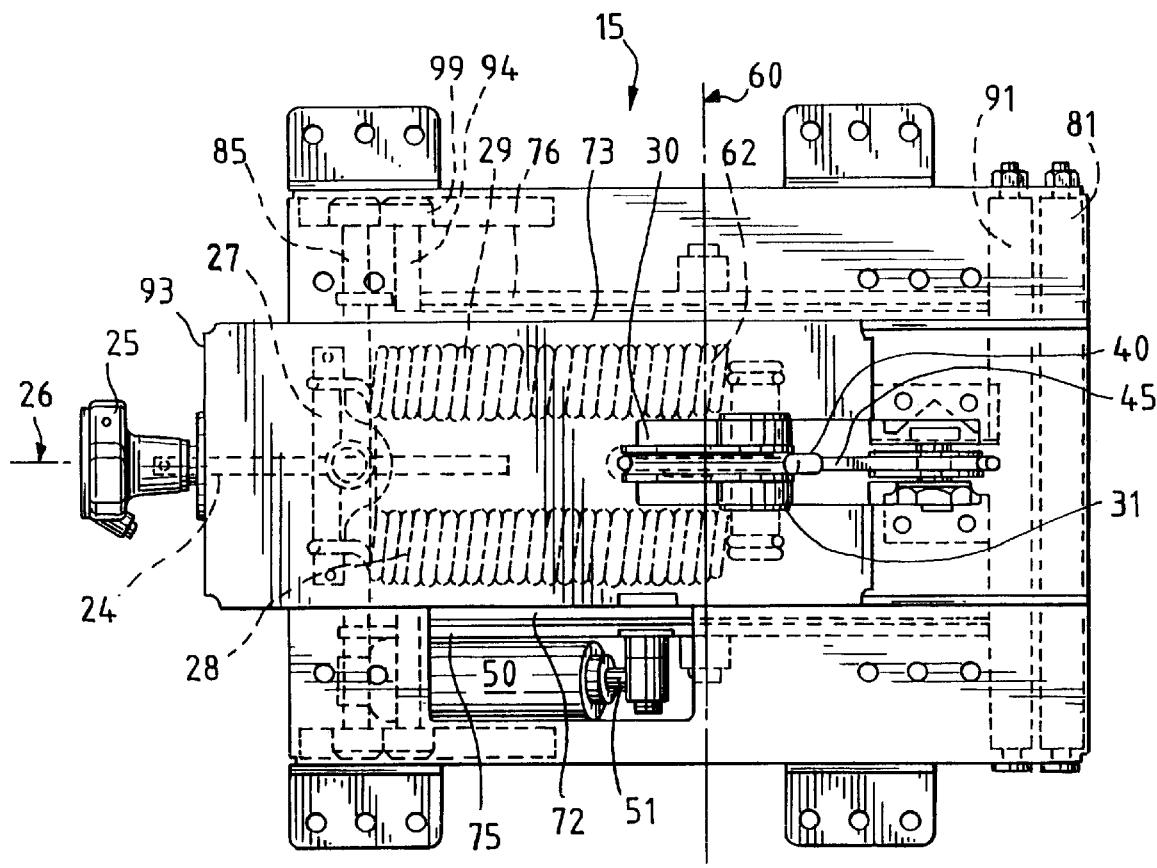

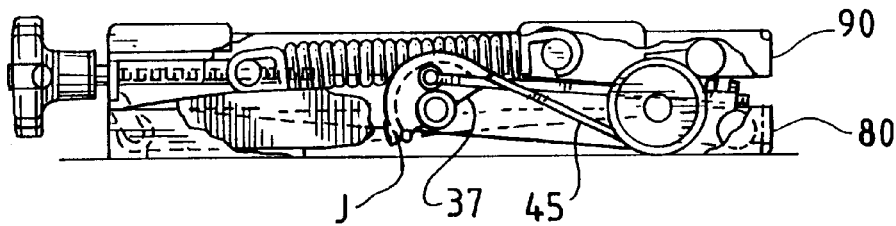
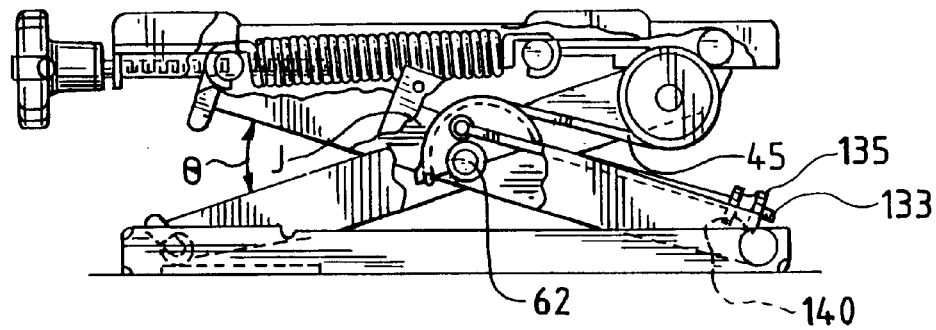
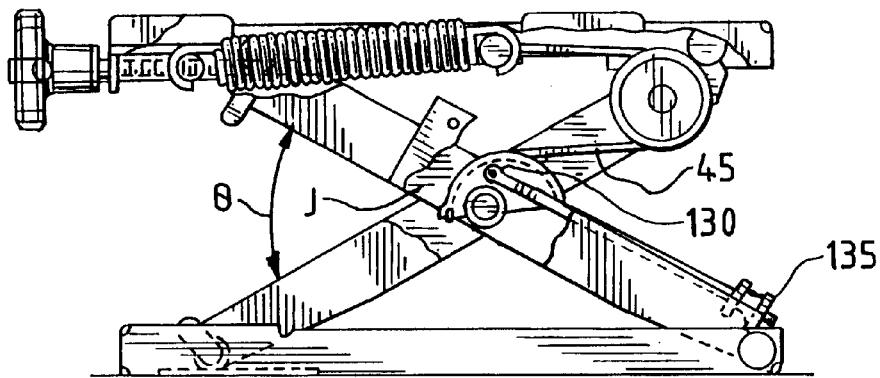
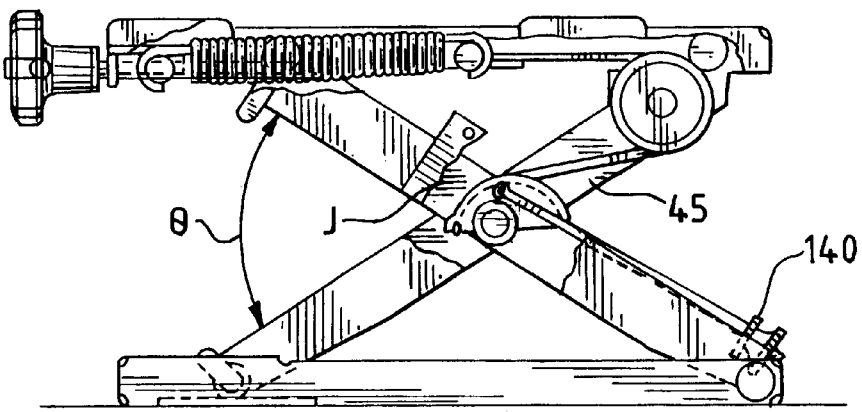

CABLE DRIVE MECHANICAL SEAT SUSPENSION

This application is a continuation-in-part of U.S. patent application Ser. No. 08/758,288, filed Dec. 3, 1996, now abandoned which is a continuation of U.S. application Ser. No. 08/502,150, filed Jun. 7, 1995, now U.S. Pat. No. 5,580,027.

BACKGROUND OF THE INVENTION

The present invention relates generally to a mechanical, adjustable seat suspension device and, more specifically, to a cable drive mechanical seat suspension device which uses springs and a cable to allow a seat occupant to conveniently adjust the vertical position of a seat and which allows for a substantially linear force-versus-deflection curve, and which allows height adjustment to a plurality of vertical positions.

There is a continuing need for suspension mechanisms that are simply constructed and inexpensive while still meeting vehicle manufacturers' ever increasing demands for compactness and comfort. An additional need exists for such a device whose suspension and ride characteristics can be easily modified. Other difficulties have been encountered in the height adjustment mechanisms of seat suspensions. Frequently, such mechanisms are difficult to reach, require levers or triggers that can pinch an operator, and generally are complicated and expensive.

Most known seat suspensions transmit the load from the seat to the suspension springs through steel bars comprising scissor arms or parallelogram linkages. Typical of these prior art devices include the following: U.S. Pat. No. 3,339,906 to Persson; U.S. Pat. No. 3,826,457 to Huot de Longcham; and U.S. Pat. No. 4,125,242 to Meiller et al. In such systems, the forces exerted on the suspension system by the seat occupant may be carried by a cam and a roller bearing. An example of such a system is described in U.S. Pat. No. 5,125,631 to Brodersen et al. and U.S. Pat. No. 4,448,386 to Moorhouse et al. Such systems are efficient and advantageous in that they allow substantial vertical seat adjustment and suspension. A disadvantage with such systems is that a substantial force is exerted on an arcuate cam and a roller bearing and often in a single-point contact relationship. This force requires hardened metal surfaces and durable components which can be expensive. Point-to-point surface contact also increases the difficulty of achieving a dependable, consistent linear relationship between suspension force and vertical deflection due to "noise" between contacting surfaces. It would thus be highly desirable for a seat suspension to provide maximum height adjustment and compactness while also being economical and providing a desired force-deflection linear relationship. It would be similarly desirable to provide such a seat suspension which provides height adjustment capabilities to discreet positions while allowing suspension and ride zone adjustment at each position.

SUMMARY OF THE INVENTION

The present invention provides an economical, compact and conveniently actuated seat suspension and height adjustment mechanism having many of the functional characteristics required for use in a heavy duty vehicle. It uses springs, a cable drive system, a idler pulley, and a drive pulley in conjunction with a scissors linkage seat suspension. The preferred embodiment of the present invention also utilizes an adjustable operating knob and adjustably eccentric drive pulley to offer various adjustment mechanisms to vary the suspension characteristics of the seat.

The present invention thus provides economical, dependable and convenient mechanical seat adjustment and support while also providing a damping means and can exhibit a linear relationship between the vertical movement of the seat and the force exerted on the suspension system. A linear force/deflection relationship is important in a seat suspension to ensure that, throughout the distance traveled by the seat, a linearly related suspension force is exerted by the suspension system. This linear relationship provides the same level of comfort and shock absorption, or "feel", to the seat occupant as the seat travels vertically.

The present invention provides a suspension assembly in conjunction with a scissors linkage system using a cable and spring and pulley which allow convenient and reliable seat adjustment and suspension in an economical apparatus.

Another object of the present invention is to provide a mechanical, adjustable seat suspension system which provides full vertical adjustability, is economical to manufacture, and which also provides a linear relationship between vertical suspension deflection and force exerted on the suspension system.

A still further object of the present invention is to provide a mechanical seat suspension system which can be adjusted to vary the suspension curve characteristics of the system easily by an operator.

DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 1 is a plan view of a preferred embodiment of the present invention.

FIG. 2 is a side view of one embodiment of the present invention illustrated in FIG. 1.

FIGS. 3A through 3D are sequential side views showing the operation of a preferred embodiment of the present invention.

DETAILED DESCRIPTION OF THE PREFERRED EMBODIMENT

Figure 4:
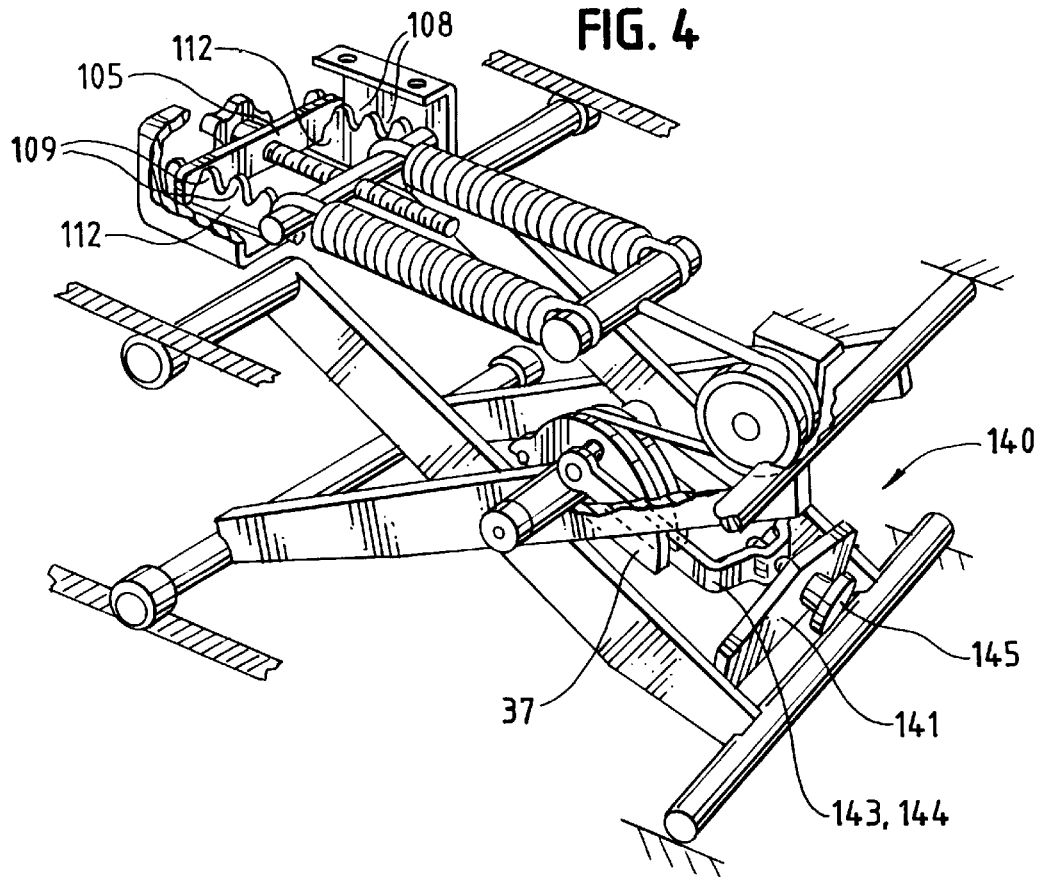
FIG. 4 is a perspective, partial cutaway view of a preferred embodiment of the present invention.

One preferred embodiment of the present invention, as shown in FIGS. 1 and 2 and designated generally 15, utilizes a scissors linkage support assembly well known in the art. In conjunction with the support assembly, the suspension system utilizes actuator knob 25 rotatably mounted on front 95 of upper housing member 90, front spring bar 27 operatively attached to coil springs 28, 29, rear spring bar 32, cable holder 40, cable 45, guide 31, idler pulley wheel 41, drive pulley 37, pivot axle 61, and shock absorber 50.

As best seen in FIGS. 3 and 4, a preferred embodiment of the present invention also includes a rack 112 with teeth 109 for adjustably receiving knob bar 105 to adjust the spring tension height of the seat. A preferred embodiment also includes an eccentric drive pulley 37 and drive pulley adjustment device 140, as best seen in FIG. 4.

As is well known in the art, scissors linkage support assemblies work to provide seat height adjustment in the following general manner. An upper housing 90 and a lower housing 80 each includes flanges 100 around the perimeter thereof. Toward the rear of each is an axle 81, 91. Attached to lower housing axle 81 and extending outwardly therefrom are parallel linkage arms 72, 73. Linkage arms 72, 73 extend upward and terminate at upper guide bar 94. Upper guide bar 94 extends across upper housing 90. At either end of upper guide bar 94 are rotatably attached rollers 99. Rollers 99 of upper guide bar 94 are slidably disposed within upper linkage tracks 92, 93 formed with flanges 100 of upper housing 90.

Attached to upper housing axle 91 are parallel linkage arms 75, 76. Linkage arms 75, 76 extend downwardly from axle 91 and terminate at lower guide bar 85. Lower guide bar 85 extends across lower housing 80. At either end of lower guide bar 85 are rotatably attached rollers 99. Rollers 99 of lower guide bar 85 are slidably disposed within lower linkage tracks 82, 83 formed within flanges 100 of lower housing 80.

Linkage arms 72, 73 cross inside of and adjacent linkage arms 75, 76 to form a cross pivot axis 60. Linkage arms 75, 76 and 72, 73 are axially connected through cross pivot axis 60 with linkage axle 61. Integrally and coaxially connecting linkage arms 72, 73 is linkage axle housing 62.

Pivotally attached to lower guide bar 85 is the stationary portion of shock absorber 50. Extending upward from lower guide bar 85, piston 51 of shock absorber 50 is pivotally connected to linkage arm 72 or 73 above axis 60. As will be apparent to those of ordinary skill in the art, this scissors linkage assembly works to provide mechanical connection for vertical movement of upper housing 90 relative to lower housing 80. When upper housing 90 is in its lowest position, angle Θ is minimized. As linkage arms 72, 73 and 75, 76 work to provide a mechanical linkage as upper housing 90 is raised relative to lower housing 80, angle Θ increases. As is well known to those of ordinary skill in the art, scissors linkage assemblies vary significantly and are not limited herein to the specific embodiment just described. Any scissors linkage assembly will suffice for the purposes of the present invention.

The present invention utilizes a cable suspension assembly in conjunction with a scissors linkage support assembly to provide seat vertical adjustability and suspension. The present invention employs, between the upper and lower housings, to vary the spacial relationship therebetween, at least one spring, a drive pulley mounted to the suspension linkage, and a cable operatively connecting the spring and drive pulley such that vertical movement of the upper housing is translated to rotational movement of the drive pulley and wherein the drive pulley and spring cooperate to provide seat suspension to a seat occupant.

Operatively, rotatably attached to the front 95 of upper housing 90 is knob 25 and threaded member 24 forming knob axis 26. Member 24 is rotatably disposed in placement rod 105. Rod 105 securely resides in a pair of notches 108 between teeth 109 of rack 112. As can be seen from FIG. 4, rod 105 can be moved into opposing pairs of notches 108 of rack 112 to vary the height of upper plate 90 while maintaining the same spring tension, and suspension curve characteristics, of the seat suspension system. This is accomplished by lifting rod 105 out of the notches 108 in which it is then placed, and placing it into another set of notches 108. Attached to member 24 rearwardly from rod 105 is laterally extending front spring bar 27. Rearward of front spring bar 27, upper housing 90 includes a slot 30 which houses guide 31. Depending from guide 31 is rear spring bar 32. Extending between rear spring bar 32 and front spring bar 27 along either side of knob axis 26 are springs 28 and 29. Cable 45 extends rearward from rear spring bar 32 to pulley wheel 41 which is secured to upper housing 90. (See FIG. 2).

Cable 45 extends around and down from wheel 41 to drive pulley 37 and is fixedly secured thereto. Drive pulley 37 is an integral part of axle housing 62 between linkage arms 72, 73 and has around its arcuate perimeter an annular cable-receiving recess 42. Drive pulley 37 can be substantially semi-circular (as shown in the FIG. 1) with its flat edge substantially along the line defined by linkage arms 72, 73 and its arcuate periphery extending upwardly therefrom (Of course, drive pulley 37 may also form a circular pulley or other shapes as described below). Thus, as is shown in FIG. 2, cable 45 travels the path between points A and J.

As illustrated in FIG. 3, suspension assembly 15 works to provide seat suspension and vertical adjustability in the following manner. When upper housing 90 is in its lowermost position, linkage arms 72, 73 and 75, 76 are substantially horizontal, angle 8 being minimized. (FIG. 3A) As such, the path defined by the length of springs 28, 29 and cable 45 in the path extending over pulley wheel 41 to and substantially around drive pulley 37 is maximized. This position results when knob 25 is rotated to place front spring bar 27 in its most rearward position thus allowing cable 45 to extend fully through the path from point A to point J. As knob 25 is rotated, causing front spring bar 27 to be moved forward, springs 28, 29 are pulled forward causing rear spring bar 32 to be pulled forward. (FIG. 3B) Causing rear spring bar 32 to be pulled forward pulls cable 45 forward. Pulling cable 45 forward creates an upward rotational force on drive pulley 37 which causes linkage arms 72, 73 to rise. Raising linkage arms 72, 73 operates to actuate the scissors linkage support assembly to raise upper housing 90. Continuing to similarly operate knob 25 continues to cause upper housing 90 to be raised. (FIGS. 3B, 3C) Operating knob 25 in the opposite direction causes front spring bar 27 to move toward rear spring bar 32 which allows upper housing 90 to descend. (FIGS. 3C, 3D)

It will, thus, be appreciated that, as knob 25 is actuated to pull cable 45 forward, angle Θ will increase. As this occurs, drive pulley 37 rotates in a clockwise direction as depicted in FIG. 3. As drive pulley 37 rotates with linkage arms 72, 73, displacement of cable 45 between pulley wheel 41 and drive pulley 37 varies. Operating knob 25 thus works to rotate point J of drive pulley 37 upward and toward pulley wheel 41 which causes linkage axle housing 62 and linkage members 72, 73 and 75, 76 to be raised.

Springs 28, 29 in conjunction with cable 45, pulley wheel 41, and drive pulley 37 provide suspension for the seat occupant as the seat is adjusted vertically. Springs 28, 29 provide equal and adequate tension to cable 45 to provide a range of comfortable suspension for a seat occupant. Springs 28, 29 offer the most adequate suspension support when the vertical deflection distance is linearly related to the force exerted on the suspension, as shown in curve A in FIG. 4. As will be appreciated by those of ordinary skill in the art, springs 28, 29 may be varied to provide differing tension strengths and length to provide a suspension assembly for varying seat heights and weights. Similarly, the radius and location of pulley wheel 41 and drive pulley 37 can be varied to provide suspension systems of variable height and weight adjustment parameters. Additionally, it is highly preferable to achieving the force/deflection linear relationship to use springs 28, 29 which have a 3:1 spring stretch to suspension travel ratio.

It will also be appreciated from the foregoing description and FIGURES that pulley wheel 41 may be manufactured of inexpensive materials such as plastic. This is so because cable 45 is generally contacting approximately 180° or more of pulley wheel 41. (FIG. 3) As such, the loads associated with the suspension are well-dispersed along a substantial length of the circumferential surface of pulley wheel 41. This allows wheel 41 to be constructed of material less expensive than the hardened metal surfaces of prior art suspension devices.

In another preferred embodiment, as best seen in FIG. 4, upper housing 90 is vertically adjustable relative to lower housing 80 independently of spring adjustment. The height of upper housing 90 is adjustable to various discreet positions via knob bar 105 as described above. In this embodiment, the height of upper housing 90 can be adjusted to multiple positions, and ride characteristics can be adjusted via knob 25 and springs 28, 29 as described above.

In another preferred embodiment, as best seen in FIGS. 3A–3D, a device is provided which allows suspension adjustment positions within a given range of seat height. In this embodiment, drive pulley 37 is rotatably affixed to linkage axle housing 62. A threaded pin 130 is rotatably disposed in pulley 37 extending transversely therefrom. Pin 130 has a threaded aperture in which is disposed a bolt 133 extending parallel to linkage arms 72, 73 to knob 135. Knob is rotatably secured to arm 72, 73 by bracket 140. Bracket 140 is secured to arm 72, 73. Rotating knob 135 rotates pulley 37 which draws or releases cable 45, thereby raising or lowering upper housing 90. Thus, within the given range of movement knob 135 and bolt 133 can impart to drive pulley 37, the height of upper housing 90 is infinitely adjustable.

Figure 5:
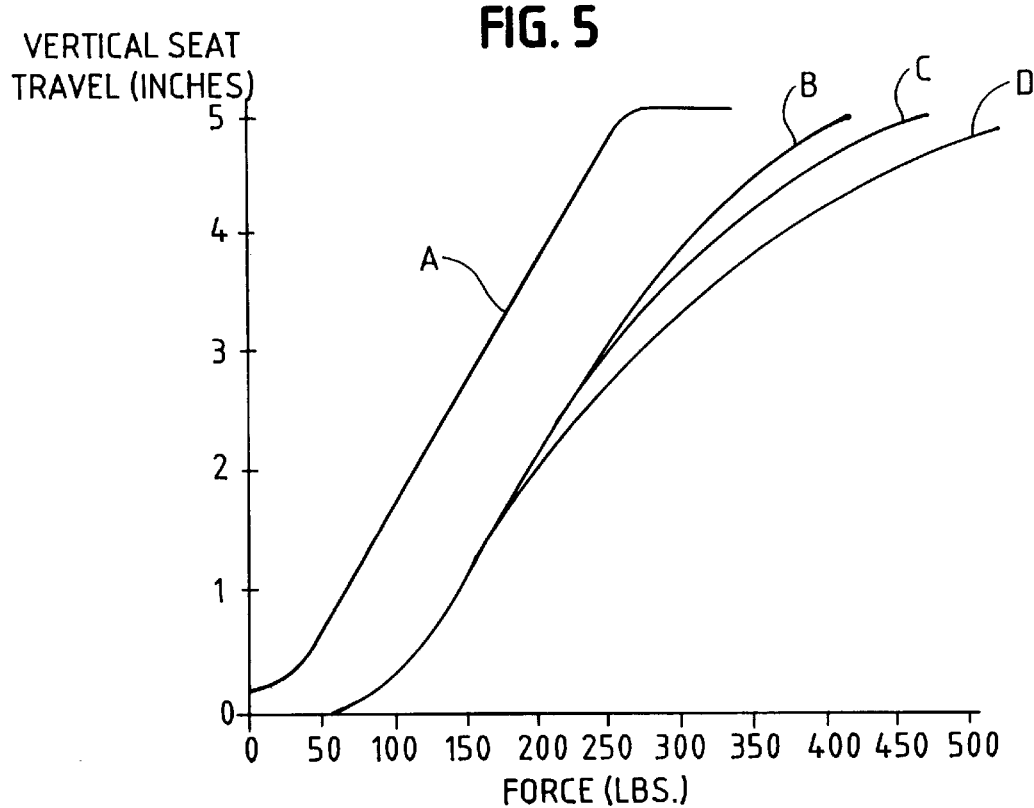
FIG. 5 is a graphic representation of some possible force/deflection characteristics of the present invention showing vertical distance traveled by the seat on the y-axis and the corresponding force exerted on the suspension on the x-axis.

In another preferred embodiment, as best seen in FIG. 4, a vehicle seat suspension is provided which provides adjustable, non-liner force/deflection curve characteristics, as best seen in FIG. 5, which provides a representation of desirable force/deflection curve characteristics. In this embodiment, drive pulley 37 is radially movable relative to linkage axle 61 substantially only along a line defined by linkage arms 72, 73 because drive pulley 37 has an elongated slot therein in which axle 61 resides. Axle 61 preferably, where it passes through the slot, is flat-sided so that drive pulley 37 is slidable along axle 61 but is not rotatable about axle 61. Drive pulley 37 is slidable along the slot such that the center of pulley 37 can be eccentric to axle 61. An adjustment mechanism 140 as seen in FIG. 4, and similar to that described above, is provided to slidably adjust drive pulley 37. As seen, mechanism 140 includes bracket 141 secured to link arms 72, 73, knob 145 and pulley arms 143, 144 connected to drive pulley 37. Arms 143, 144 are substantially parallel to the slot in drive pulley 37 and linkage arms 72, 73, so that when knob 145 is rotated, pulley 37 slides along a line parallel to linkage arms 72, 73. In an eccentric position as best seen in FIG. 4, it will be appreciated that as upper housing descends, increasingly more cable 45 is drawn by the surface of drive pulley 37, thus increasing suspension force provided by springs 28, 29 as upper housing 90 reaches lower levels. This is shown graphically in FIG. 5 by curves B, C and D. This becomes important when upper housing 90 reaches its lowermost position because it tends to prevent upper housing 90 from contacting lower housing 80 which would eliminate all suspension capabilities of the seat.

A similar force/deflection curve may be obtainable by using a drive pulley 37 which is spiral shaped. It will therefore be appreciated that the drive pulley 31 can take on any of the very many non-circular shapes available to achieve a consistent, predetermined suspension curve. In this embodiment, the drive pulley 37 can also be radially slidably, mounted to axle 61 to provide a variable, non-linear suspension curve or can be fixed.

Of course, it should be understood that various changes and modifications to the preferred embodiments described herein will be apparent to those skilled in the art. Other changes and modifications, such as those expressed here or others left unexpressed but apparent to those of ordinary skill in the art, can be made without departing from the spirit and scope of the present invention and without diminishing its attendant advantages. It is, therefore, intended that such changes and modifications be covered by the following claims.

What is claimed is:

1. An adjustable seat suspension, comprising:

an upper housing carrying a seat and a lower housing, the housings being joined by a linkage assembly permitting variation of a spacial relationship therebetween;

at least one extendable spring adjustably mounted to one of said housings;

a cable-engaging pulley mounted to said linkage assembly such that movement of the linkage assembly and variation in the spacial relationship of said housings results in rotation of said pulley;

a cable having one end connected to said spring and the other end connected to said pulley;

said spring and said pulley together cooperating with said linkage assembly to provide the suspension with an adjustable relationship between a force applied to the suspension and vertical movement of the seat;

wherein said pulley is non-arcuate whereby the suspension force supplied from the at least one spring is non-linearly related to the vertical movement of the upper housing relative to the lower housing.

2. The adjustable seat suspension of claim 1 wherein the pulley is spiral-shaped.

3. The adjustable seat suspension of claim 1 wherein the pulley is shaped such that the force supplied from the at least one spring when the upper housing is at a predetermined location relative to the lower housing is sufficient to substantially prevent the housings from contacting one another.

4. An adjustable seat suspension, comprising:

an upper housing carrying a seat and a lower housing, the housings being joined by a linkage assembly permitting variation of a spacial relationship there between;

at least one extendable spring adjustably mounted to one of said housings;

a cable-engaging pulley mounted to said linkage assembly such that movement of the linkage assembly and variation in the spacial relationship of said housings results in rotation of said pulley;

a cable having one end connected to said spring and the other end connected to said pulley;

said spring and said pulley together cooperating with said linkage assembly to provide the suspension with an adjustable relationship between a force applied to the suspension and vertical movement of the seat; and a pulley adjustment mechanism comprising a knob rotatably fixed to the linkage assembly such that actuation of the knob moves the pulley radially to adjust the force applied to the suspension and vertical movement of the seat.

5. An adjustable seat suspension, comprising:

an upper housing carrying a seat and a lower housing, the housings being joined by a linkage assembly permitting variation of a spacial relationship there between;

at least one extendable spring adjustably mounted to one of said housings via a mounting mechanism comprising a rod and rack including a plurality of adjustment positions;

a cable-engaging pulley mounted to said linkage assembly such that movement of the linkage assembly and variation in the spacial relationship of said housings results in rotation of said pulley;

a cable having one end connected to said spring and the other end connected to said pulley;

said spring and said pulley together cooperating with said linkage assembly to provide the suspension with an adjustable relationship between a force applied to the suspension and vertical movement of the seat.

* * * * *